Patented May 25, 1937

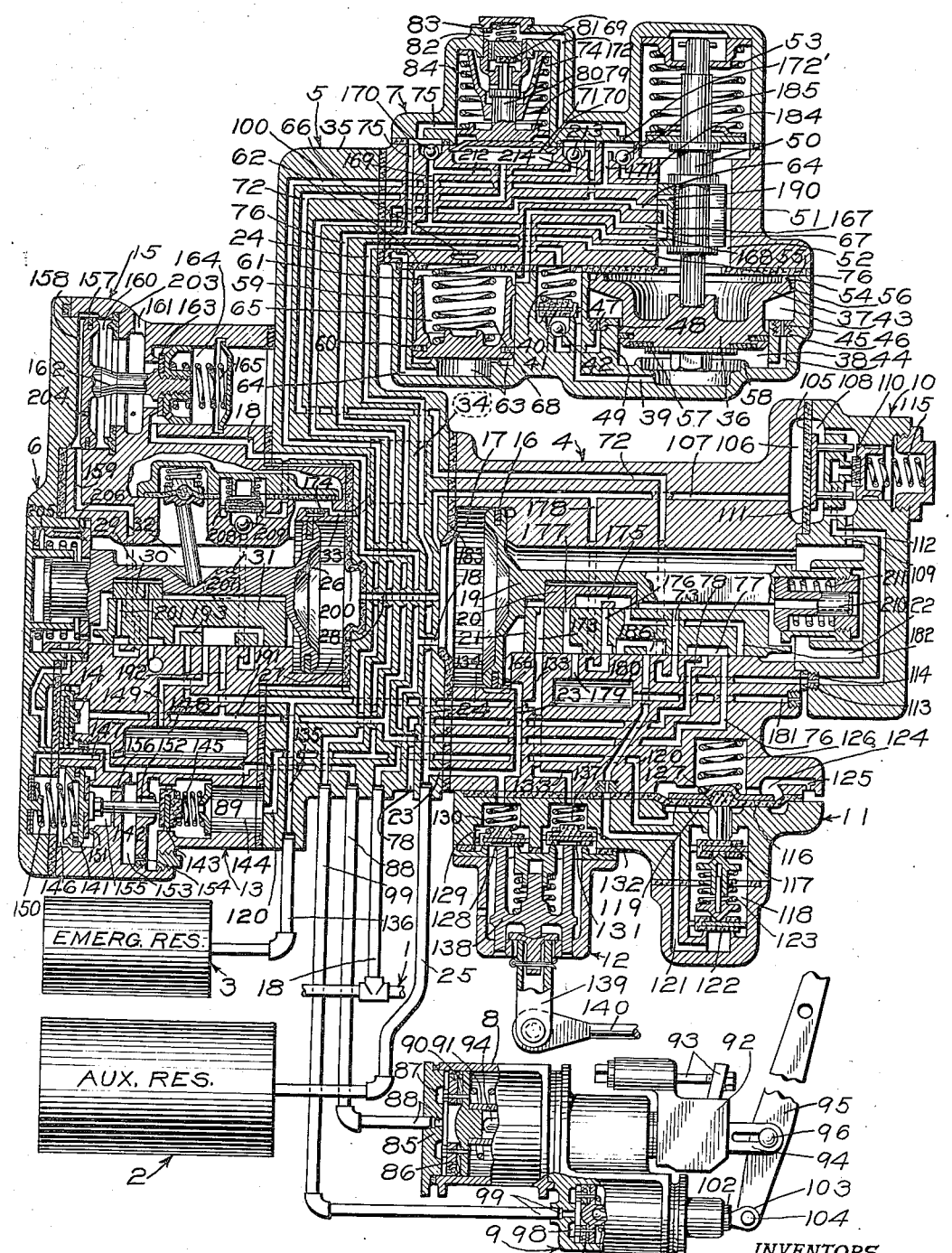

2,081,699

UNITED STATES PATENT OFFICE 2,081,699

FLUID PRESSURE BRAKE

Clyde C. Farmer, Pittsburgh, and Donald L. McNeal, Wilkinsburg, Pa., assignors to The Westinghouse Air Brake Company, Wilmerding, Pa., a corporation of Pennsylvania Application August 1, 1935, Serial No. 34,136

24 Claims. (Cl. 303—6)

This invention relates to fluid pressure brakes and more particularly to that type of apparatus which is adapted to operate upon a reduction in brake pipe pressure to effect an application of the brakes and upon an increase in brake pipe pressure to effect a release of the brakes, and in which two brake cylinders are employed, one of smaller diameter into which the fluid under pressure is admitted for the purpose of taking up the slack in the usual brake rigging and of bringing the brake shoes into contact with the vehicle wheels, and a second and larger brake cylinder to which fluid under pressure is then supplied for exerting the final braking power to the brake rigging and shoes.

In this type of apparatus, the push rods of the respective cylinders are operatively connected to a cylinder lever and the piston rod of the larger cylinder is provided with the usual latch box and latch which, together with suitable teeth in the push rod of the large brake cylinder for engagement by the latch, constitute a clutch which will permit the push rod to move outwardly, under the influence of the small brake cylinder, independently of the piston rod of the larger brake cylinder until such time as fluid under pressure is supplied to the larger brake cylinder and will then operatively couple the piston rod and push rod together in the usual manner.

It will be noted that by reason of this arrangement the piston travel of the large brake cylinder will be very short so that adequate braking power will be obtained on a heavy weight car with substantially the same quantity of compressed fluid as required for the single brake cylinder employed on light weight cars, consequently, on a heavy weight car, the auxiliary reservoir and any other additional storage reservoir, from which fluid under pressure is adapted to be supplied to effect an application of the brakes, may be of the same capacity as the corresponding reservoir or reservoirs of a light weight car. This is very desirable in that, while a greater braking force is attained, the charging of the storage reservoir or reservoirs does not increase the time required to release the brakes and recharge the apparatus over that required on light weight cars. This is especially desirable in cycling operations of the brakes on a descending grade where retainer valve devices are employed to hold a certain pressure in the brake cylinders while the apparatus on the train is being recharged, and when it is very important to recharge the apparatus in as short a time as possible, in order to make it possible to effect an application of the brakes before possible leakage of fluid under pressure from the brake cylinders can reduce the braking power on the train to such an extent as to permit the train to get beyond control.

The principal object of the invention is to provide an improved fluid pressure brake apparatus of the above mentioned type.

Another object of the invention is to provide an improved transfer valve mechanism for controlling the action of the two brake cylinders of a fluid pressure brake apparatus of the above mentioned type.

Another object of the invention is to provide means for adapting the standard "AB" fluid pressure brake equipment for use on heavy weight cars. This object is attained by substituting a new design of pipe bracket and by adding a transfer valve mechanism, a brake cylinder arrangement comprising a large or main brake cylinder device, an auxiliary or slack take-up brake cylinder device and a clutch mechanism associated with the main brake cylinder device and slightly modifying the triple valve portion of the equipment by continuing the release insuring exhaust passage to the clamping face of the triple valve casing and by adding a control port in the triple valve main slide valve which is adapted, in the release position of the triple valve device, to register with the release insuring exhaust port as will hereinafter more fully appear.

In a fluid pressure brake equipment where a main brake cylinder device and an auxiliary brake cylinder device are employed, it is highly desirable in releasing the brakes to release the latch mechanism between the main brake cylinder device and its push rod before the auxiliary brake cylinder device is permitted to move toward release position, so as to prevent the auxiliary brake cylinder device, acting through the medium of the push rod of the main brake cylinder, from damaging the latch, and to accomplish this it has heretofore been proposed to provide the main brake cylinder device with an exhaust valve which, when the piston of the main brake cylinder device is about to complete its final release movement and after the latch has been released, will vent fluid under pressure from the auxiliary brake cylinder device and effect the operation of the auxiliary brake cylinder device to release position. With this type of apparatus the main brake cylinder piston may fail to move promptly to its release position or may fail to complete its full movement to release position due, for instance, to a weak release spring. This will result in either a delayed opening of the auxiliary brake cylinder release valve, or only a partial opening of the release valve and may, in some instances, not open at all, so that the release of fluid under pressure from the auxiliary brake cylinder device will be either delayed or prevented, which of course is undesirable.

Another object of the invention is to provide a release valve mechanism whereby the release of fluid under pressure from the auxiliary brake cylinder device is adapted to be effected independently of the movement of the main brake cylinder device to release position, thus eliminating the above mentioned undesirable features and insuring a prompt complete release of the brakes, and a further feature resides in the control means for delaying the venting of fluid from the auxiliary reservoir to such an extent as to permit the latch mechanism associated with the main brake cylinder device to be moved out of locking engagement with the push rod of the main brake cylinder device before the auxiliary brake cylinder device moves toward release position, thus the latch mechanism is moved to its unlocking position without opposition by the auxiliary brake cylinder device.

Other objects and advantages will appear in the following more detailed description of the invention.

In the accompanying drawing, the single figure is a diagrammatic view, mainly in section, of a fluid pressure brake equipment embodying the invention.

As shown in the drawing, the fluid pressure brake apparatus may comprise a brake pipe 1, an auxiliary reservoir 2, an emergency reservoir 3, a triple valve device 4, a pipe bracket 5, an emergency valve device 6, a transfer valve mechanism 7, a main brake cylinder 8 and an auxiliary or slack take-up brake cylinder device 9.

The apparatus may also comprise a release insuring valve device 10, a quick service modifying valve device 11 and a reservoir release valve device 12, all of which are carried by the casing of the triple valve device. The apparatus may further comprise an inshot valve device 13, a timing valve 14 and a vent valve device 15, all of which are carried by the casing of the emergency valve device.

The triple valve device 4, emergency valve device 6 and the several devices above enumerated which are carried by the casings thereof may be of substantially the same construction as the corresponding devices shown in United States Letters Patent No. 2,031,213, issued February 18, 1936, although the showing in the drawing has been somewhat simplified to more clearly illustrate the invention.

Briefly described, the triple valve device 4 may comprise a casing which is secured to one side of the pipe bracket 5 and in which there is mounted a piston 16 having at one side a chamber 17 with which the brake pipe 1 is in communication by way of a pipe and passage 18. The piston is provided with a stem 19 which is adapted to operate an auxiliary slide valve 20 and a main slide valve 21 contained in a chamber 22 connected through passages 23 and 24 and a pipe 25 to the auxiliary reservoir 2.

The emergency valve device 6 may comprise a casing which is secured to another side of the pipe bracket 5 and in which there is mounted a piston 26 having at one side a chamber 27 which is connected by way of a passage 28 to the triple valve piston chamber 17. The piston 26 is provided with a stem 29 which is adapted to operate an auxiliary slide valve 30 and a main slide valve 31 contained in a chamber 32 connected through a passage 33 with a quick action chamber 34.

The transfer valve device 7 is for the purpose of controlling the supply of fluid under pressure to and the release of fluid under pressure from the brake cylinder devices 8 and 9 and comprises a casing which is secured to an extension 35 of the pipe bracket 5. Operatively mounted in the casing are connected control pistons 36 and 37 which are of different diameters, the piston 36 being of less diameter than the piston 37. At one side of the smaller piston there is a chamber 38 which is in constant open communication with the auxiliary reservoir 2 by way of a passage 39, a chamber 40 containing check valves 41 and 42, passage 24 and pipe 25. At the same side of the larger piston 37 there is a chamber 43 which is connected to the piston chamber 38 through a passage 44 and the flow restricting passage 45 of a choke plug 46 having screw-threaded connection with the casing. The piston chamber 43 is also connected by way of the flow restricting passage 47 in a choke plug 48 to a passage 49 leading to the under side of the check valve 42.

The connected control pistons 36 and 37 are provided with a stem 50 which is adapted to operate a slide valve 51 contained in a chamber 52, said stem being subject to the action of a spring 53 contained in the chamber 52.

The inner face of the piston 37 is provided with an annular seat rib 54 which is adapted to engage a gasket 55 secured to the casing. The peripheral edge of the piston is provided with a groove 56 through which the valve chamber 52 is adapted to be connected to the piston chamber 43 when the seat rib 54 is moved out of engagement with the gasket 55.

The outer face of the smaller piston 36 is provided with a gasket 57 which is adapted to engage an annular seat rib 58 formed on the casing and when in such engagement cuts off communication between the passage 39 and the piston chamber 38.

The transfer valve device also comprises a vent valve mechanism 59 which, as will hereinafter more fully appear, is for the purpose of preventing any build-up of fluid pressure in the brake cylinder 8 until the pressure of fluid in the take-up brake cyinder 9 has been increased sufficiently to take up the slack in the brake rigging in effecting an application of the brakes, and which, in releasing the brakes, serves to accelerate the release of fluid under pressure from the main brake cylinder device when the pressure in the brake cylinder is about five pounds. This mechanism comprises a piston 60 which is provided at one side with a valve 61 adapted to engage a gasket 62 mounted in the casing. At one side of the piston 60 there is a chamber 63 which is connected to a passage 64 leading to the seat for the control slide valve 51 and at the other side there is a chamber 65 which is constantly connected through a passage 66 with the atmosphere, and which is adapted to be connected to a passage 67 leading to the seat for the control slide valve 51. With the valve 61 in the position shown, the passage 67 is connected to the chamber 65 and when the valve is in engagement with the gasket this connection is cut off. Contained in the chamber 65 is a light coil spring 68 which normally maintains the piston 60 in the position in which it is shown, in which position the valve 61 is out of engagement with the gasket 62.

The transfer valve device 7 further comprises a release valve mechanism 69 which, as will hereinafter more fully appear, is for the purpose of releasing fluid under pressure from the take-up brake cylinder 9. This mechanism comprises a flexible diaphragm 70 having at one side a chamber 71 which is connected to a passage 72 leading to the seat for the main slide valve 21 of the triple valve device, said passage, with the main slide valve in release position, being connected through a port 73 in the slide valve to the triple valve slide valve chamber 22. At the other side of the flexible diaphragm there is a chamber 74 which is connected through a passage 75 to a passage 76 leading to the seat for the main slide valve 21 of the triple valve device, which passage 76, with the slide valve 21 in release position, is connected to the atmosphere by way of a cavity 77 in the slide valve, a passage 78 and the usual retaining valve device (not shown) but which, as will be understood, is connected to the exhaust passage 78 in the usual well known manner.

Contained in the diaphragm chamber 74 and cooperating with the flexible diaphragm 70 is a movable follower 79 having a stem 80 adapted to control the operation of a release valve 81 contained in a chamber 82. Also contained in the chamber 82 is a coil spring 83 which at all times acts to urge the valve 81 toward its seat.

Interposed between and operatively engaging the follower 79 and the casing is a coil spring 84 which, at all times, tends to urge the follower and thereby the flexible diaphragm 70 in the release valve closing direction.

The brake cylinder device 8 may comprise the usual cylinder which is closed at one end by a pressure head 85 and which contains a piston 86 at one side of which there is a chamber 87 connected through a passage and pipe 88 to a passage 89 leading to the inshot valve device 13, said piston being normally held in its release position by means of the usual release spring 90 which surrounds a hollow piston rod 91 with which the brake cylinder piston is provided. The end of the hollow piston rod extends outwardly beyond the non-pressure head of the cylinder and is provided with the usual latch box 92 and latch mechanism 93 which operates automatically to engage a push rod 94 slidably mounted in the hollow piston rod so as to form a driving connection between the piston rod and the push rod when the piston 86 has been moved outwardly a short distance in effecting an application of the brakes. The outer end of the push rod 94 is operatively connected to the usual brake cylinder lever 95 by means of a pin 96.

The slack take-up brake cylinder 9 comprises the usual cylinder which, as shown in the present embodiment of the invention, may be integral with the non-pressure head of the brake cylinder 8. Contained in the cylinder is a slack take-up piston 97 at one side of which there is a chamber 98 connected through a passage and pipe 99 to a passage 100 leading to the seat for the control slide valve 51 of the transfer valve device 7, said piston being held in release position by means of the usual release spring 101 which surrounds the usual hollow piston rod 102. Loosely mounted in the piston rod 102 is a push rod 103 which at its outer end is operatively connected to one end of the brake cylinder lever 95 by means of a pin 104, the opposite end of the lever being fulcrumed to a fixed part of the vehicle (not shown) carrying the equipment.

It will here be understood that the operation of the latch mechanism is substantially the same as that of the corresponding mechanism shown and described in United States Letters Patent No. 2,004,654, issued June 11, 1935.

The release insuring valve device 10 may comprise a flexible diaphragm 105, at one side of which there is a chamber 106 which is connected through a passage 107 to the triple valve piston chamber 17 and consequently to the brake pipe 1. At the other side of the diaphragm there is a chamber 108 which is connected through a passage 109 to the triple valve slide valve chamber 22 and consequently to the auxiliary reservoir 2. Contained in the chamber 108 is a vent valve 110 which is controlled by said diaphragm and a follower 111 to either open or close a communication between the chamber 108 and a passage 112 which is connected through the flow restricting passage 113 in a choke plug 114 to the passage 72, said valve being normally held closed by the action of a coil spring 115.

The quick service modifying valve device 11 is for the purpose of limiting the final quick service flow of fluid from the brake pipe according to a predetermined brake cylinder pressure in effecting a service application of the brakes, and may comprise a flexible diaphragm 116 which is adapted to control the operation of a limiting valve 117 to open or close communication from a chamber 118, which contains the valve, to a chamber 119 at one side of the flexible diaphragm. The chamber 119 is connected to a brake cylinder passage 120 leading to the inshot valve device 13. A restricted quick service passage 121 leading from the seat for the main slide valve 21 of the triple valve device is connected to the chamber 118 past a check valve 122 contained in said chamber. Also contained in the chamber 118 and interposed between the valve 117 and the check valve 122 is a spring assemblage 123 which tends to urge both of these valves toward their respective seats. At the other side of the flexible diaphragm there is a chamber 124 which is connected through a passage 125 with the atmosphere and which contains a spring 126 which acts through the medium of the diaphragm and a fluted plunger 127 to normally maintain the valve 117 open against the opposing pressure of the spring assemblage 123.

The reservoir release valve device 12 is for the purpose of venting fluid under pressure from either the auxiliary reservoir 2 or from both the auxiliary reservoir 2 and the emergency reservoir 3, and is also for the purpose, as will hereinafter appear, of effecting the release of the brakes in the event of the brake pipe being depleted of fluid pressure as is the case when the locomotive is detached from the train or when a car is set out from a train. This device comprises an auxiliary reservoir vent valve 128 which is contained in a chamber 129 connected to the auxiliary reservoir passage 23 and which is normally held seated by the action of a coil spring 130, and also comprises an emergency reservoir vent valve 131 which is contained in a chamber 132 connected through passages 133, 134, 135 and a pipe 136 to the emergency reservoir 3 and which is normally held seated by the action of a coil spring 137. The valve 128 when unseated establishes communication from the auxiliary reservoir to the atmosphere and the valve 131 when unseated establishes communication from the emergency reservoir to the atmosphere. Arranged at the seating side of the valves and slidably mounted in the casing of the device is a member 138 which is operable to unseat one or both of said valves. Interposed between and operatively engaging the casing and the member is a rockable member or lever 139 which is adapted to be actuated by means of a pull rod 140 to effect the operation of the member 138.

The inshot valve device 13 and timing valve 14 are for the purpose of controlling or varying the rate of build-up of brake cylinder pressure in effecting an emergency application of the brakes. In effecting a service application of the brakes these devices are so controlled that they do not function to vary the brake cylinder build-up rate.

The inshot valve device 13 may comprise a valve piston 141 having a stem 142 adapted to actuate an inshot valve 143 which is contained in a chamber 144 connected to the passage 120, and which is subject to the pressure of a spring 145 also contained in chamber 144. At one side of the piston valve there is a chamber 146 which is connected through a passage 147 and a reservoir or chamber 148 of small volume to a passage 149 leading to the seat for the main slide valve 31 of the emergency valve device. Contained in the chamber 146 is a spring 150 which, acting through the medium of the valve piston 141 and stem 142, normally holds the inshot valve 143 unseated against the opposing pressure of the spring 145. The spring 150 also acts to normally hold the valve piston seated on an annular seat rib 151 formed on the casing of the device. With the inshot valve 143 unseated, the chamber 144 is connected to the brake cylinder passage 89 by way of a passage 152 and a passage 153. The chamber 144 is also connected to the passage 153 through the flow restricting passage of a choke plug 154 having screw-threaded connection with the casing. At the seating side of the valve piston 141 there is a chamber 155 which is connected through a passage 156 to the passage 153 and consequently to the brake cylinder passage 89.

The vent valve device 15 comprises a piston 157 having at one side a chamber 158 which is connected to a passage 159 leading to the seat for the main slide valve 31 of the emergency valve device. At the other side of the piston there is a chamber 160 which is connected through a passage 161 with the atmosphere. The piston is provided with a stem 162 which is adapted to actuate a vent valve 163 contained in a chamber 164 which is connected to the brake pipe passage 18, said valve being normally held seated by the action of a coil spring 165; thus the communication from the valve chamber and consequently from the brake pipe to the atmospheric chamber 160 is normally maintained closed.

Initial charging

In charging the apparatus fluid under pressure supplied to the brake pipe 1 in the usual manner flows through pipe and passage 18 to the piston chamber 17 of the triple valve device and from thence flows through passage 28 to the piston chamber 27 of the emergency valve device.

With the piston and slide valves 20 and 21 of the triple valve device in release position, as shown in the drawing, fluid under pressure flows from piston chamber 17 through a feed groove 166 to the slide valve chamber 22 and from thence flows through passages 23 and 24 and pipe 25 to the auxiliary reservoir. Fluid supplied to the passage 24 besides flowing to the auxiliary reservoir also flows through the check valve chamber 40 of the transfer valve device 7 and through passage 39 to the control piston chamber 38 causing the control pistons 36 and 37 and thereby the control slide valve 51 to move to their innermost position in which they are shown in the drawing. In this position, the annular seat rib 54 on the piston 37 engages the gasket 55 and closes communication between the chamber 43 and the slide valve chamber 52. Further, with the pistons in this position fluid flows from the piston chamber 38 to the piston chamber 43 by way of passage 44 and the flow restricting passage 45 in the choke plug 46.

Fluid under pressure also flows from the slide valve chamber 22 of the triple valve device to the diaphragm chamber 71 of the release valve mechanism 69 by way of port 73 in the triple valve main slide valve 21 and passage 72, causing the diaphragm 70 to flex inwardly against the opposing pressure of the spring 84 acting through the medium of the follower 79 which is moved inwardly by the diaphragm. The follower stem 80, when the follower is thus moved inwardly, unseats the valve 81 compressing the spring 83.

With the control slide valve 51 in its inner position the chamber 63 is normally connected to the atmosphere by way of passage 64, a cavity 167 in the control slide valve 51, passage 67, past the valve 61 of the piston 60, spring chamber 65 and passage 66, and with the chamber thus at atmospheric pressure, the spring 68 acts to maintain the piston 60 in the position in which it is shown in the drawing.

Further, with the control slide valve 51 in its inner position the piston chamber 87 of the brake cylinder 8 is connected with the atmosphere by way of passage and pipe 88, passage 89, passage 153 of the inshot valve device 13, passage 152, past the unseated inshot valve 143, through inshot valve chamber 144, passage 120, a passage 168, cavity 167 of the control slide valve 51, passage 67, past the unseated valve 61 of the piston 60, chamber 65 and passage 66.

With the triple valve parts in release position the passage 168 and therefore the piston chamber 87 of the brake cylinder 8 is also connected to the atmosphere by way of a branch passage 169 past a ball check valve 170, through passages 75 and 76, cavity 77 in the main slide valve 21 of the triple valve device and passage 78.

The control slide valve in its inner position uncovers the passage 76 which, as just described, is connected with the atmosphere by way of the triple valve device so that the control slide valve chamber 52 is at atmospheric pressure.

With the release valve 81 unseated, the piston chamber 98 of the slack take-up brake cylinder 9 is connected with the atmosphere by way of passage and pipe 99, passage 100, a branch passage 171, a passage 172 having a flow restricting portion 172', release valve chamber 82, past the unseated valve 81, through chamber 74, passages 75 and 76, cavity 77 in the main slide valve 21 of the triple valve device and passage 78.

Fluid under pressure flows from the triple valve piston chamber 17 through passage 107 to the diaphragm chamber 106 of the release insuring valve device 10. The chamber 108 at the other side of this chamber is charged with fluid which flows from the triple valve slide valve chamber 22 by way of passage 109.

Fluid under pressure also flows from the triple valve slide valve chamber 22 to the emergency reservoir 3 by way of a restricted port 173, passages 133, 134 and 135 and pipe 136.

With the emergency valve parts in release position fluid under pressure flows from the emergency piston chamber 27 through the flow restricting passage in a choke plug 174 to the passage 33 and from thence flows to the emergency slide valve chamber 32 and quick action chamber 34.

*Service application of the brakes*

If it is desired to effect a service application of the brakes, a gradual reduction in brake pipe pressure is effected in the usual manner. The pressure of fluid in the triple valve piston chamber 17 reduces with the pressure of fluid in the brake pipe, thereby permitting fluid under pressure in valve chamber 22 to shift the triple valve piston 16 outwardly toward application position.

The piston 16 as it is thus being moved closes the feed groove 166 and causes the auxiliary slide valve 20 to be shifted relative to the main slide valve 21, said valve 20 first lapping the port 173 and thereby closing communication between the auxiliary reservoir 2 and emergency reservoir 3, and then bringing a quick service cavity 175 into registration with quick service ports 176 and 177 in the main slide valve 21. The port 176 is in registration with a passage 178 leading from the passage 107 which is in communication with the brake pipe 1 by way of the triple valve piston chamber 17 and passage and pipe 18, and the port 177 is in registration with a passage 179 leading to a small quick service chamber 180 which is connected through a restricted passage 181 with the atmosphere. It will thus be seen that with the ports 176 and 177 connected through the cavity 175, fluid under pressure is locally vented from the brake pipe to said chamber 180 at a rapid rate and then to the atmosphere at a slower rate; thus an initial local reduction in brake pipe pressure is effected. The auxiliary slide valve in its movement relative to the main slide valve uncovers the service port 182 in the main slide valve, and since this port is closed at the face of the main slide valve there will be no flow of fluid therethrough from the valve chamber 22.

With the quick service communication thus established and the service port 182 open the piston stem operatively engages the main slide valve 21 so that the piston as it continues to move outwardly shifts the main slide valve in the same direction along with the auxiliary slide valve 20 to application position in which the annular bead on the face of the piston engages a gasket 183 clamped between the triple valve casing and the pipe bracket 5.

As the main slide valve 21 is thus being shifted, the cavity 77 is moved out of connecting relation with the passage 76 and then the service port 182 is cracked open to the port 76 so that fluid under pressure now flows from the slide valve chamber 22 and connected auxiliary reservoir 2 through the service port 182 and passage 76 to the control slide valve chamber 52 of the transfer valve device 7, and from thence flows through a passage 184, past a ball check valve 185 and through passages 171 and 100 and pipe 99 to the piston chamber 98 of the take-up brake cylinder 9.

After the service port is cracked open to the passage 76, as just described, the cavity 77 connects the passage 72 leading from the diaphragm chamber 71 to the passage 78 which leads to the atmosphere so that fluid under pressure is vented from the chamber 71. With the chamber 71 thus vented, the spring 84 acts to move the follower 79 and its stem 80 outwardly thereby permitting the spring 83 to act to close the valve 81.

Further, after the service port has been cracked open to the passage 76, a quick service cavity 186 in the main slide valve connects the passage 178, which is in communication with the brake pipe, to the quick service passage 121 so that fluid under pressure is vented from the brake pipe to the atmosphere by way of passage 178, cavity 186, passage 121, past the check valve 122, through check valve chamber 118, past the open quick service limiting valve 117 and fluted plunger 127, through diaphragm chamber 119, passages 120 and 168, cavity 167 in the control slide valve 51 of the transfer valve device 7, passage 67, past the unseated valve 61 of the piston 60, spring chamber 65 and passage 66.

When the usual annular bead on the face of the piston engages the gasket 183 the associated slide valves will be in application position. With the main slide valve in this position, the service port 182 is in full registration with the passage 76, the passage 72 is fully open to the cavity 77 and the quick service passages 178 and 121 are fully open to the cavity 186.

The flow of fluid to the piston chamber 98 of the slack take-up cylinder device 9 causes the piston 97 to move outwardly causing the push rod 103 to actuate the brake cylinder lever 95 to take up the slack in the brake rigging, that is to say, to bring the usual brake shoes into contact with the treads of the car wheels.

It will here be noted that the pressure of fluid in the control slide valve chamber and acting on the inner face of both pistons 36 and 37 is increasing, and that the pressure of fluid in the chamber 38 and acting on the face of the small piston 36 is reducing with the auxiliary reservoir pressure, due to the flow of fluid from said reservoir to the valve chamber 52 and slack take-up piston chamber 98, while the pressure in the chamber 43 is reducing at a slow rate through the flow restricting passage 45 of the choke plug 46 and passage 44 into the piston chamber 38. Now when the pressure of fluid in the control slide valve chamber 52 and consequently in the slack take-up piston chamber 98 has been increased a predetermined amount, say for instance to fifty pounds, this fluid pressure together with the pressure of the spring 53 causes the connected pistons 36 and 37 to move outwardly. As soon as the seat rib 54 of the piston 37 is moved out of engagement with the gasket 55, the pressure of fluid in the chamber 43 equalizes into the control slide valve chamber 52 by way of the groove 56 in the piston, causing a sudden reduction in fluid pressure in the chamber 43. With the pressure in chamber 43 thus suddenly reduced the pressure of fluid in chamber 52 together with the pressure of the spring 53 causes the pistons 36 and 37 and thereby the slide valve 51 to be moved to their outermost transfer position with a snap action.

With the control slide valve 51 in its outer position, a port 190 in the control slide valve connects the control slide valve chamber 52 to the passage 64 so that fluid under pressure is supplied from this chamber to the piston chamber 63. Fluid under pressure supplied to this chamber quickly overcomes the pressure of the light spring 68 and causes the piston 60 to move to its inner position in which the valve 61 engages the gasket 62 and closes the communication from the passage 67 to the atmospheric passage 66.

Further, with the control slide valve 51 in its outer position, the cavity 167 therein connects the passage 76 to the passage 168 and laps the passage 67. Fluid under pressure being supplied through the service port 182 of the main slide valve 21 of the triple valve device to the passage 76 now flows to the piston chamber 87 of the brake cylinder device 8 through cavity 167 in the control slide valve 51, passages 168 and 120, inshot valve chamber 144, past the inshot valve 143, passage 152, passage 153, passage 89 and pipe and passage 88.

Since the passage 120 is no longer in communication with the atmospheric passage 66 but is in communication with the brake cylinder device 8 as just described, the local quick service flow of fluid from the brake pipe by way of the triple valve device and quick service modifying valve device 11 is to the brake cylinder device 8.

When the pressure of fluid in the brake cylinder device 8 and consequently in the diaphragm chamber 119 of the quick service modifying valve device 11 has been increased to around nine or ten pounds, the flexible diaphragm will be caused to flex upwardly against the opposing pressure of the spring 126, permitting the spring assemblage 123 to seat the valve 117 and thus cut off the quick service flow of fluid from the brake pipe.

Fluid under pressure supplied to the piston chamber 87 of the brake cylinder device 8 causes the brake cylinder piston 86, piston rod 91 and latch box 92 to move outwardly. Upon the initial movement of the latch box, the latch mechanism 93 locks the piston rod 91 to the push rod 94 so that as the force of the piston increases this force is transmitted to the brake cylinder lever 95 through the connected rods 91 and 94, the effective length of the push rod having been adjusted upon the movement of the lever 95 by the slack take-up brake cylinder device 9.

Fluid under pressure supplied to the passage 76, besides flowing to the brake cylinder devices 8 and 9, also flows to the piston chamber 146 of the inshot valve device 13 by way of a passage 191, a passage 192, a cavity 193 in the main slide valve 31 of the emergency valve device 6, a passage 149, chamber 148 and passage 147 so that fluid at brake cylinder pressure in chamber 155 will not be permitted to move to vary the rate of flow of fluid to the brake cylinder device 9.

In order to effect a release of the brakes after an application, fluid under pressure is supplied to the brake pipe 1 and triple valve piston chamber 17 in the usual manner. Fluid under pressure supplied to the chamber 17 causes the triple valve piston 16 and thereby the slide valves 20 and 21 to move to release position.

In the release position of the triple valve parts, fluid under pressure flows from the triple valve piston chamber 17 through feed groove 166 to valve chamber 22, auxiliary reservoir 2 and that portion of the chamber 38 within the inner seated area of the control piston 36. Fluid under pressure also flows from the slide valve chamber 22 through port 73 and passage 72 to the diaphragm chamber 71 of the exhaust valve device 69.

With the triple valve parts in release position, the cavity 77 in the main slide valve 21 connects the passage 76 to the exhaust passage 78, so that fluid under pressure now flows from the brake cylinder device 8 and spring chamber 74 of the release valve mechanism 69 to the atmosphere, the flow of fluid from the brake cylinder device being by way of passage and pipe 88, passage 89, chamber 153 of the inshot valve device, passage 152, past the open inshot valve 143, through valve chamber 144, passages 120 and 168, cavity 167 in the control slide valve 51 and passage 67, and the flow of fluid from the chamber 74 being by way of passages 75 and 76.

Now when the pressure of fluid in diaphragm chamber 71 of the release valve mechanism 69 acting on one side of the diaphragm 70 has been increased sufficiently to overcome the combined pressures of the spring 84 and the decreasing brake cylinder pressure acting on the other side, the diaphragm will be flexed inwardly causing the follower 79 to act to unseat the release valve 81, as shown in the drawing.

With the valve 81 unseated fluid under pressure flows from the slack take-up brake cylinder device 9 and valve chamber 52 of the control valve device to the atmosphere, the flow of fluid from the take-up brake cylinder device being by way of passage and pipe 99, passages 100 and 171, restricted passage 172, past the open valve 81, spring chamber 74 and passages 75 and 76, and the flow of fluid from the valve chamber 52 being by way of passage 184 past the ball check valve 185 and through the restricted passage 172. Since the piston chamber 43 of the control valve device is in communication with the valve chamber 52, the pressure of fluid in chamber 43 will reduce with that in chamber 52.

It is very desirable that the piston 86 of the brake cylinder device 8 move a sufficient distance toward its release position to cause the latch mechanism 93 to move out of locking engagement with the push rod 94 before the piston 97 of the slack take-up brake cylinder 9 starts to move toward its release position, so as to prevent damage to the latch mechanism and latch box 92, and in the present embodiment of the invention this is accomplished through the medium of the release valve mechanism 69. This mechanism 69 is so designed that the diaphragm 70 will not flex inwardly and cause the valve 81 to be unseated until the auxiliary reservoir pressure in diaphragm chamber 71 is approximately thirty-five pounds higher than the combined brake cylinder pressure and spring pressure acting on the opposite side of the diaphragm. Before the actuating fluid pressure differential has been obtained on the diaphragm, the piston 86 will have been moved at least a sufficient distance to have caused the latch mechanism to move out of locking engagement with the push rod 94. When the valve 81 is unseated, the flow of fluid from the take-up brake cylinder device 9 is retarded by the restriction in the passage 172 and as a result the release action of the take-up brake cylinder device is further delayed. The total delay period may be, for example, seventeen seconds, that is to say, if it requires around twenty-two seconds for the main brake cylinder piston to move to release position, the time required for the slack take-up brake cylinder piston to move to release position will be around thirty-five seconds.

When the pressure of fluid in chamber 38 acting on the inner seated area of the small control piston 36 is sufficient to overcome the combined pressures of the spring 53 and the decreasing pressure of fluid acting on the opposite side of the piston, the pistons 36 and 37 and thereby the piston stem and slide valve 51 are caused to move inwardly to their normal release position. As the pistons start to move in this direction, the seal between the seat rib 58 and the gasket 57 carried by the piston 36 is broken, so that fluid under pressure now acts over the entire area of the face of the small piston 36 and causes the pistons and slide valves to move to their normal release position with a snap-like action. It will here be understood that the flow area of the passage 45 in the choke plug 46 is such that the flow of fluid therethrough from the piston chamber 38 to the chamber 43 and from thence to the atmosphere by way of the groove 56 in the piston 37 and valve chamber 52 will have no appreciable retarding effect on the movement of the pistons to their normal position in which the seat rib 54 on the piston 37 engages the gasket and closes off the communication between the chambers 43 and 52.

With the control slide valve 51 in its normal inner position as shown in the drawing, the passage 76 is uncovered, so that fluid under pressure which has not been discharged from the slide valve chamber 52 by way of the release valve mechanism now flows to the atmosphere by way of passage 76, exhaust cavity 77 in the main slide valve 21 of the triple valve device and passage 78. Further, with the slide valve 51 in this position, the cavity 167 therein connects together passages 64, 67 and 168. Fluid under pressure now flows from the chamber 63 through passage 64 and cavity 167, passage 168, passage 169, past the ball check valve 170 and through passage 75 to the passage 76, the reduction in the pressure of fluid in the chamber, due to such flow, permitting the spring 68 to act to move the valve piston 60 to unseat the valve 61. With the valve 61 unseated, the passage 67 is connected by way of spring chamber 65 and passage 66 to the atmosphere, so that fluid under pressure from the chamber 63 and brake cylinder devices 8 and 9 may now flow through this communication to the atmosphere. The flow of fluid from the brake cylinder devices 8 and 9 to the atmosphere is also by way of the exhaust cavity 77 in the main slide valve of the triple valve device.

It will be noted that when, with the several parts of the apparatus in application position, the cavity 77 in the main slide valve of the triple valve device connects the passage 72 leading from the diaphragm chamber 71 of the release valve mechanism 69, and passage 112, to the exhaust passage 78, fluid under pressure is vented from the chamber 71 to the atmosphere. When in releasing the brakes, the brake pipe pressure in the diaphragm chamber 106 of the release insuring valve device 10 exceeds auxiliary reservoir pressure in chamber 108, the diaphragm 105 is flexed inwardly causing the follower 111 to unseat the valve 110 against the opposing action of the spring 115. With the valve 110 unseated, fluid under pressure is vented from the auxiliary reservoir to the atmosphere at a restricted rate by way of passage 109, past the valve 110, passage 112, passage 113 in the choke plug 114, passage 72, cavity 77 in the main slide valve of the triple valve device and passage 78, thus insuring the prompt movement of the triple valve device to release position. Any temporary increase in fluid pressure in the diaphragm chamber 71 of the release valve mechanism 69 which may occur due to such venting will not cause the diaphragm to act to unseat the valve 81 since the pressure of fluid in the spring chamber 74 together with the pressure of the spring 84 will be greater than can be produced at this time in the chamber 71 and as a consequence, the several parts of the release valve mechanism will remain in the position to which they have been previously moved.

It will be seen from the foregoing description that when an application of the brakes is initiated the control valve device of the transfer mechanism will function to delay the action of the main brake cylinder device 8 to application position until the desired fluid pressure has been obtained in the slack take-up brake cylinder device 9, and that when the release of the brakes is initiated, the release valve mechanism functions to delay the release action of the take-up brake cylinder device for a period of time sufficient to permit the main brake cylinder device 8 to move at least to its latch releasing position.

When it is desired to effect an emergency application of the brakes, a sudden reduction in brake pipe pressure is effected which causes the several parts of the triple valve device to move to application position, in which the flow of fluid from the auxiliary reservoir to the brake cylinders occurs in the same manner as has been described in connection with the effecting of a service application of the brakes.

This reduction in brake pipe pressure is also effective in the emergency piston chamber 27 and as a consequence fluid in the emergency valve chamber 32 at quick action chamber pressure causes the emergency piston 26 and thereby the auxiliary and main slide valves 30 and 31, respectively, to move to emergency position in which the annular bead on the face of the piston engages a gasket 200. With the slide valves 30 and 31 in emergency position, fluid under pressure flows from the quick action chamber 34 and valve chamber 32 by way of a port 201 in the slide valve 31 and passage 159 to the quick action piston chamber 158, causing the quick action piston to move inwardly to unseat the quick action vent valve 163 against the opposing pressure of the spring 165. With the vent valve 163 unseated, fluid under pressure is vented from the brake pipe to the atmosphere by way of passage 18, vent valve chamber 164 and passage 161. An annular boss on the back of the quick action piston 157 engages a gasket 203 carried by the casing to prevent leakage of fluid from the piston chamber 158 to the atmosphere past the periphery of the piston. With the piston 157 in this position, fluid under pressure is vented from the piston chamber 158 and consequently from the quick action chamber 34 and emergency valve chamber 32 to the atmosphere by way of a port 204 of small diameter in the piston 157, the reduction in quick action chamber pressure in the piston chamber 158 being at such a slow rate that the piston will be maintained in the position to which it has been moved until the brake pipe pressure has been reduced to substantially atmospheric pressure. The spring 165 then acts to seat the valve 163.

With the several parts of the emergency valve device in emergency position, fluid under pressure flows from the emergency reservoir 3 to the passage 76 by way of pipe 136, passages 135 and 134, cavity 193 in the main slide valve 31 and passages 192 and 191. Since fluid under pressure is being supplied from the auxiliary reservoir 2 to the passage 76 by way of the valve chamber 22 of the triple valve device and port 182 in the triple valve main slide valve 21, fluid under pressure from both the auxiliary reservoir and the emergency reservoir flows to the slack take-up brake cylinder device 9 by way of the communication which has been traced in connection with a service application of the brakes. When the take-up brake cylinder pressure has been increased to approximately fifty pounds, the control piston 36 and slide valve 51 of the transfer valve device 7 are caused to move to their outer position in which the other parts of the transfer valve device are caused to operate in the same manner as described in connection with a service application of the brakes.

With the control slide valve 51 in its outer position the cavity 167 connects the passages 76 and 168 so that fluid under pressure now flows from both the auxiliary reservoir and emergency reservoir by way of the inshot valve device 13 to the main brake cylinder device 8.

It will here be understood that when an emergency reduction in brake pipe pressure is effected the mergency valve device moves so quickly to emergency position that the main slide valve 31 thereof laps the passage 149 leading to the piston chamber 146 of the inshot valve device 13 before any appreciable flow of fluid from the passage 192 to the passage 149 can occur. Due to this, the piston chamber 146 of the inshot valve device will be at substantially atmospheric pressure.

Now when the brake cylinder pressure in chamber 155 of the inshot valve device has been increased sufficiently to overcome the opposing pressure of the spring 150, the inshot piston 141 will be caused to move to its outer position, permitting the spring 145 to act to seat the inshot valve 143. With the valve 143 seated, the flow of fluid from the auxiliary and emergency reservoirs to the brake cylinder devices is by way of the flow restricting passage in the choke plug 154. Now when the pressure of fluid acting on one side of the timing valve device 14 becomes higher than the reducing quick action chamber pressure acting on the other side, said device operates to connect the passage 191 to a flow restricting portion of the passage 89. Fluid under pressure now flows to the brake cylinder device by way of both restricting communications instead of one, and as a consequence, there is a final inshot of fluid to the brake cylinder devices. From this it will be seen that when the control slide valve 51 of the transfer valve mechanism operates to supply fluid under pressure to the brake cylinder device 8, the inshot valve device 13 functions to provide a controlled build-up of brake cylinder pressure in three stages, the first stage being at a rapid rate, the second at a slower rate and the third at a rapid rate, which controlled build-up provides for the proper control of the brakes without causing the slack in the train from running in or closing harshly.

When it is desired to release an emergency application of the brakes, the brake pipe pressure is increased causing the emergency valve device to move either to its normal release position or to an inner release position and the triple valve device to move to release position. With these devices in release position, the transfer valve device 7 functions the same as in releasing the brakes after a service application.

At the front end of a train where the increase in brake pipe pressure is at a rapid rate, the emergency valve device will move to its inner release position against the opposing pressure of a spring 205 and stop 206. In this position, the cavity 193 in the main emergency slide valve 31 connects the passage 192 to a passage 207 leading to the passage 18 which is in communication with the brake pipe 1 and to the passage 194. Interposed in the passage 207 are check valves 208 and 209 which are arranged in series and which are adapted to prevent back flow of fluid from the brake pipe.

It will here be understood that when an emergency application of the brakes has been effected, the valve chamber 32 of the emergency valve device will be at substantially atmospheric pressure and that the valve chamber 22 of the triple valve device will be at brake cylinder pressure; consequently when the brake pipe pressure is increased to effect the release of the brakes, the several parts of the emergency valve device are caused to move to release position before the triple valve parts start to move from application position, so that, with the passages 192 and 207 connected together by the cavity 193 in the emergency main slide valve, fluid under pressure flows from both the auxiliary reservoir 2 and brake cylinder device 8 to the brake pipe 1. The flow of fluid from the auxiliary reservoir to the brake pipe is by way of pipe 25, passage 23, slide valve chamber 22 of the triple valve device, service port 182 in the triple valve main slide valve 21, passages 76, 191 and 192, cavity 193 and passage 207. Fluid under pressure flows from the main brake cylinder device 8 by way of passage and pipe 88, passage 89, past the open timing valve 14, passages 191 and 192 and cavity 193. Fluid under pressure being back dumped through the cavity 193 also flows through passage 194, volume reservoir or chamber 148 and passage 147 to the inshot piston chamber 146 and as a result the pressure of fluid in chamber 146 substantially equalizes with the pressure of fluid acting on the other side of the inshot piston 141. The spring 150 now acts to move the piston 141 inwardly and the piston, acting through the medium of its stem unseats the inshot valve 143, so that fluid under pressure from the main brake cylinder device also flows to the brake pipe by way of passage and pipe 88, passages 89, 153 and 152, past the open inshot valve 143, valve chamber 144, passages 120 and 168, cavity 167 in the control slide valve 51, passage 76 and the communication just traced from the passage 76 to the brake pipe. The back dumping of fluid under pressure from the auxiliary reservoir 2 and brake cylinder device 8 assists in rapidly charging the brake pipe and also serves to accelerate the release action of the several parts and devices of the equipment.

When the triple valve device moves to release position the transfer valve device functions the same as in effecting a release of the brakes after a service application.

When the pressure of fluid in the emergency slide valve chamber 32 becomes substantially equal to brake pipe pressure in the emergency piston chamber 27, the spring 205 acting through the medium of the stop 206 causes the piston and thereby the emergency slide valves 30 and 31 to move from their inner release position to their outer release position in which the back dump passage 207 is lapped by the main slide valve 31.

It will be noted that when the back dump of fluid under pressure from the main brake cylinder 8 and auxiliary reservoir takes place the triple valve device will be in application position and that there will be back flow of fluid from the take-up brake cylinder 9 by way of passage and pipe 99, control valve chamber 52, groove 56 in the control piston 37, piston chamber 43, flow restricting passage 47 in the choke plug 48, passage 49, past the check valves 42 and 41, through passages 24 and 23 and slide valve chamber 22 of the triple valve device, but the flow of fluid through the passage 47 will be at a slower rate than the rate of flow of fluid from the main brake cylinder 8 to the brake pipe, thus delaying the operation of the take-up brake cylinder device 9 to release position for a period of time sufficient to permit the latch mechanism 93 to be moved out of locking engagement with the push rod 94 before the take-up brake cylinder operates to move the brake cylinder lever 95.

To set a car out of a train it is the practice to first close the rear angle cock in the brake pipe of the car ahead of the car to be set out and then uncouple the hose couplings between these cars. Because of the consequent sudden venting of brake pipe pressure the emergency valve device is caused to move to emergency position and if the triple valve device has not already been moved to application position the venting of the brake pipe will cause it to be moved to this position; thus an emergency application of the brakes is effected.

Before the car to be set out can be moved it is necessary to release the brakes, and since the brake pipe of the car is no longer in communication with a source of fluid pressure the brake cylinder pressure must be released without having to move the triple valve device and emergency valve device to release position.

In order to effect the release of the brakes, the trainman, by the use of the rod 140, moves the operating lever 139 so as to unseat both the auxiliary reservoir vent valve 128 and the emergency reservoir vent valve 131. If the trainman moves the lever 139 just far enough to unseat the auxiliary reservoir vent valve 128 only, the brakes will also be released, as will appear in the following description.

When both valves 128 and 131 are unseated, fluid under pressure is vented from the main brake cylinder device 8 by way of passage and pipe 88, passages 89, 153 and 152, past the open inshot valve 143, inshot valve chamber 144, passage 168, cavity 167 in the control slide valve 51 and passage 76. From the passage 76 fluid under pressure is adapted to flow to the atmosphere two ways, first by way of passages 191 and 192, cavity 193 in the emergency main slide valve, passages 134 and 133, vent valve chamber 132 and past the open emergency reservoir vent valve 131 to the atmosphere, and second by way of the service port 182 in the triple valve main slide valve 21, triple valve slide valve chamber 22, passage 23, vent valve chamber 129 and past the open auxiliary reservoir vent valve 128 to the atmosphere.

The release of fluid under pressure from the slack take-up cylinder device 9 occurs by way of passage and pipe 99, passage 100, control slide valve chamber 52 of the transfer valve device, groove 56 in the control piston 37, control piston chamber 43, choke plug 48, past the check valves 42 and 41, through passages 24 and 23, valve chamber 129 and past the open auxiliary reservoir vent valve 128.

It will here be understood that the rate of flow of fluid under pressure from the take-up brake cylinder device 9, due to the flow restricting passage 47 in the choke plug 48, is slower than the rate of flow of fluid under pressure from the main brake cylinder device 8; consequently the brake cylinder device 8 is operated to its latch releasing position before the take-up brake cylinder device 9 moves to release position, thus eliminating the possibility of damage to the latch mechanism by the take-up brake cylinder device.

If the trainman should only move the rod 140 and thereby the lever 139 just far enough to unseat only the auxiliary reservoir vent valve 128, the release of fluid under pressure from the main brake cylinder device is by way of passage and pipe 88, passages 89, 153 and 152, past the open inshot valve 143, inshot valve chamber 144, passages 120 and 168, cavity 167 in the control slide valve 51, passage 76, service port 182 in the triple valve main slide valve 21, triple valve slide valve chamber 22, passage 23, valve chamber 129, and past the valve 128 to the atmosphere. Fluid under pressure is vented from the emergency reservoir 3 by way of pipe 136, passages 135 and 134, cavity 193 in the emergency main slide valve 31, passages 192 and 191, passage 76, which passage 76, as just described, is connected to the atmosphere. Fluid under pressure is vented from the take-up brake cylinder device 9 to the atmosphere at a restricted rate by way of passage and pipe 99, passage 100, control slide valve chamber 52, groove 56 in the control piston 37, control piston chamber 43, the flow restricting passage 47 in the choke plug 48, passage 49, past the check valves 42 and 41, through passages 24 and 23, valve chamber 129 and past the valve 128.

It will here be noted that the triple valve device is provided with a quick service stabilizing mechanism which preferably comprises a plunger 210 and a spring 211 which cooperate to stabilize the triple valve parts against unintentional movement of the triple valve parts to their quick service position in the same manner as the corresponding mechanism disclosed and broadly claimed in the aforementioned Patent No. 2,031,213. In effecting an application of the brakes the plunger 210 engages the main slide valve, and the piston stem as it is moved relative to the triple valve main slide valve compresses the spring 211.

When, in releasing the brakes by means of the auxiliary reservoir discharge valve 128, the pressure of fluid in the triple valve slide valve 22 has been reduced to such an extent that the compressed spring 211 of the stabilizing mechanism acts to move the triple valve piston 16 and thereby the auxiliary slide valve 20 to lap position, the slide valve 20 cuts off the flow of fluid from the brake cylinder to the valve chamber 22. With the service port thus lapped any fluid under pressure remaining in the brake cylinder device 8 is vented to the atmosphere by way of passage and pipe 88, passages 89, 153 and 152, past the open inshot valve 143, inshot valve chamber 144, passages 120, 168 and 169, a passage 212, past a ball check valve 213, through a passage 214, passage 100, control slide valve chamber 52, groove 56 in the control piston 37, passage 47 in the choke plug 48, passage 49, past the check valves 42 and 41, through passages 24 and 23, valve chamber 129 and past the valve 128. It will thus be seen that when the triple valve auxiliary slide valve is moved to application lap position by the action of the stabilizing mechanism the substantially complete release of brake cylinder pressure is insured. This is very desirable for, if repairs to the brake equipment are necessary, even a low brake cylinder pressure might under such repairs be difficult to make.

While one illustrative embodiment of the invention has been described in detail, it is not our intention to limit its scope to this embodiment or otherwise than by the terms of the appended claims.

Having now described our invention, what we claim as new and desire to secure by Letters Patent, is:

1. In a fluid pressure brake, in combination, a brake pipe, a slack take-up brake cylinder, a main brake cylinder, a passage through which fluid under pressure is adapted to be supplied to and released from both brake cylinders, a valve device normally subject to fluid pressure for establishing communication from the slack take-up brake cylinder to said passage and operative upon a release of fluid under pressure to close said communication, a brake controlling valve mechanism normally connecting said passage to the atmosphere and operative upon a reduction in brake pipe pressure for cutting off the communication from said passage to the atmosphere, for releasing fluid under pressure to effect the operation of said valve device, and for supplying fluid under pressure to said passage, valve means normally establishing communication through which fluid under pressure supplied to said passage flows to the slack take-up brake cylinder and operative upon a predetermined increase in slack take-up brake cylinder pressure to establish communication through which fluid under pressure supplied to said passage flows to the main brake cylinder.

2. In a fluid pressure brake, in combination, a brake pipe, a slack take-up brake cylinder, a main brake cylinder, a valve device normally subject to fluid pressure for establishing a venting communication for the slack take-up brake cylinder, a passage through which fluid under pressure is adapted to be supplied to both brake cylinders, a brake controlling valve mechanism normally connecting said passage to the atmosphere and for supplying fluid under pressure to said valve device and operative upon a reduction in brake pipe pressure for cutting off the connection from said passage to the atmosphere, for venting fluid under pressure from said valve device to cause the valve device to function to close said venting communication and for supplying fluid under pressure to said passage, and means normally establishing communication through which fluid under pressure flows from said passage to the slack take-up brake cylinder and operative upon a predetermined increase in slack take-up brake cylinder pressure for establishing communication through which fluid flows from said passage to the main brake cylinder.

3. In a fluid pressure brake, in combination, a brake pipe, a slack take-up brake cylinder, a main brake cylinder, an auxiliary reservoir normally charged with fluid under pressure, a valve device normally subject to fluid pressure for establishing a venting communication from the slack take-up brake cylinder, a passage through which fluid under pressure is adapted to be supplied to both brake cylinders, a brake controlling valve mechanism normally connecting said passage to the atmosphere and for supplying fluid under pressure to said valve device and operative upon a reduction in brake pipe pressure for cutting off the connection from said passage to the atmosphere, for venting fluid under pressure from said valve device to cause the valve device to operate to close said venting communication and for supplying fluid under pressure from the auxiliary reservoir to said passage, and valve means subject to the opposing pressures of the auxiliary reservoir and slack take-up brake cylinder for establishing communication from said passage to the take-up brake cylinder and operative upon a reduction in auxiliary reservoir pressure due to the flow of fluid therefrom to the slack take-up brake cylinder and an increase in slack take-up brake cylinder pressure for connecting said passage and thereby the auxiliary reservoir to the main brake cylinder.

4. In a fluid pressure brake, in combination, a brake pipe, a slack take-up brake cylinder, a main brake cylinder, a valve device operative to control a venting communication from the slack take-up brake cylinder, a valve mechanism adapted in effecting an application of the brakes to supply fluid under pressure to the slack take-up brake cylinder and to the main brake cylinder in sequence in the order in which they are named, and a brake controlling valve device operated upon a reduction in brake pipe pressure for effecting the operation of said valve device to close the venting communication and for effecting the operation of said valve mechanism to supply fluid to the brake cylinders and operated upon an increase in brake pipe pressure to vent fluid under pressure from the main brake cylinder and to effect the operation of said valve device to vent fluid under pressure from the slack take-up brake cylinder.

5. In a fluid pressure brake, in combination, a brake pipe, a slack take-up brake cylinder, a main brake cylinder, a valve device operative to control a venting communication from the slack take-up brake cylinder, a valve mechanism adapted in effecting an application of the brakes to supply fluid under pressure to the slack take-up brake cylinder and to the main brake cylinder in sequence in the order in which they are named, and a brake controlling valve device operated upon a reduction in brake pipe pressure for effecting the operation of said valve device to close the venting communication and for effecting the operation of said valve mechanism to supply fluid to the brake cylinders and operated upon an increase in brake pipe pressure to vent fluid under pressure from the main brake cylinder and to effect the operation of said valve device to vent fluid under pressure from the slack take-up brake cylinder, the operation of said valve device to vent fluid under pressure from the slack take-up brake cylinder being delayed by fluid at brake cylinder pressure acting in opposition to the increasing pressure of fluid being supplied by the brake controlling valve device.

6. In a fluid pressure brake, in combination, a brake pipe, a slack take-up brake cylinder, a main brake cylinder, a valve device operative to control a venting communication from the slack take-up brake cylinder, a valve mechanism adapted in effecting an application of the brakes to supply fluid under pressure to the slack take-up brake cylinder and to the main brake cylinder in sequence in the order in which they are named, and a brake controlling valve device operated upon a reduction in brake pipe pressure for effecting the operation of said valve device to close the venting communication and for effecting the operation of said valve mechanism to supply fluid to the brake cylinders and operated upon an increase in brake pipe pressure to vent fluid under pressure from the main brake cylinder and to effect the operation of said valve device to vent fluid under pressure from the slack take-up brake cylinder, the operation of said valve device to vent fluid under pressure from the slack take-up brake cylinder being delayed by fluid at brake cylinder pressure and the pressure of a spring acting in opposition to the increasing pressure of fluid being supplied by the brake controlling valve device.

7. In a fluid pressure brake, in combination, a brake pipe, a slack take-up brake cylinder, a main brake cylinder, a valve device operative to control a venting communication from the slack take-up brake cylinder, a valve mechanism adapted in effecting an application of the brakes to supply fluid under pressure to the slack take-up brake cylinder and to the main brake cylinder in sequence in the order in which they are named, and a brake controlling valve device operated upon a reduction in brake pipe pressure for effecting the operation of said valve device to close the venting communication and for effecting the operation of said valve mechanism to supply fluid to the brake cylinders and operated upon an increase in brake pipe pressure to vent fluid under pressure from the main brake cylinder and to effect the operation of said valve device to vent fluid under pressure from the slack take-up brake cylinder, said valve device being subject to the increasing pressure of fluid being supplied by the brake controlling valve device and the opposing pressure of a spring and the reducing brake cylinder pressure and operative to vent fluid under pressure from the slack take-up brake cylinder when the fluid pressure differential on the valve mechanism is sufficient to overcome the pressure of said spring.

8. In a fluid pressure brake, in combination, a brake pipe, a slack take-up brake cylinder, a main brake cylinder, a valve device operative to control a venting communication from the slack take-up brake cylinder, a valve mechanism adapted in effecting an application of the brakes to supply fluid under pressure to the slack take-up brake cylinder and to the main brake cylinder in sequence in the order in which they are named, and a brake controlling valve device operated upon a reduction in brake pipe pressure for effecting the operation of said valve device to close the venting communication and for effecting the operation of said valve mechanism to supply fluid to the brake cylinders and operated upon an increase in brake pipe pressure to vent fluid under pressure from the main brake cylinder and to effect the operation of said valve device to vent fluid under pressure from the slack take-up brake cylinder, said valve device being subject to the increasing pressure of fluid being supplied by the brake controlling valve device and the opposing reducing brake cylinder pressure and operative to vent fluid under pressure from the slack take-up brake cylinder when the pressure of fluid supplied by the brake controlling valve device exceeds brake cylinder pressure a predetermined degree.

9. In a fluid pressure brake, in combination, a brake pipe, a slack take-up brake cylinder, a main brake cylinder, a reservoir normally charged with fluid under pressure, a valve device for controlling a venting communication from the slack take-up brake cylinder, said valve device being operative by fluid under pressure to open said venting communication and operative upon the venting of fluid under pressure therefrom to close the venting communication, a passage through which fluid under pressure is adapted to be supplied to and released from the valve device, a brake controlling valve device normally establishing communication through which fluid under pressure is supplied from the brake pipe to said reservoir and communication through which fluid under pressure is supplied to said passage and operative upon a reduction in brake pipe pressure for venting fluid under pressure from said passage and thereby from said valve device and for supplying fluid under pressure to said valve mechanism and thereby to the brake cylinders, and means subject to the opposing pressures of the brake pipe and reservoir operative upon a predetermined increase in brake pipe pressure over the pressure of the reservoir in releasing the brakes for venting fluid under pressure from the reservoir to said passage.

10. In a fluid pressure brake, in combination, a brake pipe, a main brake cylinder, an auxiliary brake cylinder, a triple valve device and an emergency valve device operative upon a sudden reduction in brake pipe pressure to supply fluid under pressure to both of said brake cylinders to effect an emergency application of the brakes, and a valve mechanism establishing communication through which fluid under pressure supplied by the triple valve device and emergency valve device flows to the auxiliary brake cylinder and operative upon a predetermined increase in auxiliary brake cylinder pressure for establishing a communication through which fluid under pressure is supplied to the main brake cylinder and another communication through which fluid under pressure is adapted to be supplied to the auxiliary brake cylinder.

11. In a fluid pressure brake, in combination, a brake pipe, a main brake cylinder, an auxiliary brake cylinder, a triple valve device and an emergency valve device operative upon a sudden reduction in brake pipe pressure to supply fluid under pressure to both of said brake cylinders to effect an emergency application of the brakes, a valve mechanism establishing communication through which fluid under pressure supplied by the triple valve device and emergency valve device flows to the auxiliary brake cylinder and operative upon a predetermined increase in auxiliary brake cylinder pressure for establishing a communication through which fluid under pressure is supplied to the main brake cylinder and another communication through which fluid under pressure is adapted to be supplied to the auxiliary brake cylinder, the two last mentioned communications being open to each other, and means in the last mentioned communication preventing back flow of fluid under pressure from the auxiliary brake cylinder to the main brake cylinder through said communications.

12. In a fluid pressure brake, in combination, a brake pipe, a main brake cylinder, an auxiliary brake cylinder, a triple valve device and an emergency valve device operative upon a sudden reduction in brake pipe pressure to supply fluid under pressure to both of said brake cylinders to effect an emergency application of the brakes, a valve mechanism establishing communication through which fluid under pressure supplied by the triple valve device and emergency valve device flows to the auxiliary brake cylinder and operative upon a predetermined increase in auxiliary brake cylinder pressure for establishing a communication through which fluid under pressure is supplied to the main brake cylinder and another communication through which fluid under pressure is adapted to be supplied to the auxiliary brake cylinder, and means interposed between said valve mechanism and main brake cylinder for varying the rate of flow of fluid under pressure to the main brake cylinder.

13. In a fluid pressure brake, in combination, a brake pipe, a main brake cylinder, an auxiliary brake cylinder, a triple valve device and an emergency valve device operative upon a sudden reduction in brake pipe pressure to supply fluid under pressure to both of said brake cylinders to effect an emergency application of the brakes, a valve mechanism establishing communication through which fluid under pressure supplied by the triple valve device and emergency valve device flows to the auxiliary brake cylinder and operative upon a predetermined increase in auxiliary brake cylinder pressure for establishing a communication through which fluid under pressure is supplied to the main brake cylinder and another communication through which fluid under pressure is adapted to be supplied to the auxiliary brake cylinder, and means interposed between said valve mechanism and main brake cylinder conditioned by the operation of the emergency valve device to emergency position to vary the rate of increase in the pressure of fluid in the main brake cylinder.

14. In a fluid pressure brake, in combination, a brake pipe, a main brake cylinder, an auxiliary brake cylinder, a triple valve device and an emergency valve device operative upon a sudden reduction in brake pipe pressure to supply fluid under pressure to both of said brake cylinders to effect an emergency application of the brakes, a valve mechanism establishing communication through which fluid under pressure supplied by the triple valve device and emergency valve device flows to the auxiliary brake cylinder and operative upon a predetermined increase in auxiliary brake cylinder pressure for establishing a communication through which fluid under pressure is supplied to the main brake cylinder and another communication through which fluid under pressure is adapted to be supplied to the auxiliary brake cylinder, and means controlled by the emergency valve device to vary the rate of increase in the pressure of fluid in the main brake cylinder in effecting an emergency application of the brakes and to render the means ineffective to vary the rate of increase in main brake cylinder pressure in effecting a service application of the brakes.

15. In a fluid pressure brake, in combination, a brake pipe, a main brake cylinder, an auxiliary brake cylinder, brake controlling valve means operated either upon a service reduction in brake pipe pressure or an emergency reduction in brake pipe pressure to supply fluid under pressure to effect an application of the brakes, a valve device establishing a communication through which fluid under pressure supplied by the brake controlling valve means flows to the auxiliary brake cylinder and operative upon a predetermined increase in auxiliary brake cylinder pressure to establish a communication through which fluid under pressure supplied by the brake controlling valve means flows to the main brake cylinder, and means controlled by said brake controlling valve means to control the rate of flow of fluid to the main brake cylinder, said means being rendered operative upon the operation of the brake controlling valve means in response to an emergency reduction in brake pipe pressure to vary the rate of flow of fluid to the main brake cylinder, and being rendered inoperative to vary the rate of flow of fluid to the main brake cylinder upon the operation of the brake controlling valve means in response to a service reduction in brake pipe pressure.

16. In a fluid pressure brake, in combination, a brake pipe, a main brake cylinder, an auxiliary brake cylinder, brake controlling valve means operated either upon a service reduction in brake pipe pressure or an emergency reduction in brake pipe pressure to supply fluid under pressure to effect an application of the brakes, a valve device establishing a communication through which fluid under pressure supplied by the brake controlling valve means flows to the auxiliary brake cylinder and operative upon a predetermined increase in auxiliary brake cylinder pressure to establish a communication through which fluid under pressure supplied by the brake controlling valve means flows to the main brake cylinder, and a main brake cylinder build-up control valve device through which the flow of fluid to the main brake cylinder flows, and means in the brake controlling valve means operative only in response to an emergency reduction in brake pipe pressure for effecting the operation of the brake cylinder build-up control valve device to vary the rate of build-up of main brake cylinder pressure.

17. In a fluid pressure brake, in combination, a brake pipe, a main brake cylinder, an auxiliary brake cylinder, an emergency valve device operated upon an emergency reduction in brake pipe pressure for supplying fluid under pressure to effect an emergency application of the brakes, and a valve mechanism establishing communication through which fluid under pressure supplied by the emergency valve device flows to the auxiliary brake cylinder and operative upon a predetermined increase in auxiliary brake cylinder pressure to establish communication through which fluid supplied by the emergency valve device flows to the main brake cylinder, said emergency valve device being operative upon an increase in brake pipe pressure after an emergency reduction in brake pipe pressure to a position for supplying fluid under pressure from the main brake cylinder to the brake pipe by way of the last mentioned communication.

18. In a fluid pressure brake, in combination, a brake pipe, a main brake cylinder, an auxiliary brake cylinder, an auxiliary reservoir, an emergency reservoir, means operated upon an emergency reduction in brake pipe pressure for supplying fluid under pressure from the auxiliary reservoir and the emergency reservoir for effecting an emergency application of the brakes, a valve mechanism establishing a communication through which fluid under pressure supplied by said means flows to the auxiliary brake cylinder and operative upon a predetermined increase in auxiliary brake cylinder pressure to establish communication through which fluid supplied by said means flows to the main brake cylinder, said means including an emergency valve device operated upon an increase in brake pipe pressure after an emergency application for establishing a communication through which fluid under pressure is supplied from the auxiliary reservoir and main brake cylinder to the brake pipe, a communication established by said valve mechanism through which fluid under pressure is adapted to flow back from the auxiliary brake cylinder to the auxiliary reservoir, and means for restricting the rate of flow of fluid from the auxiliary brake cylinder to the auxiliary reservoir.

19. In a fluid pressure brake, in combination, a brake pipe, a main brake cylinder, an auxiliary brake cylinder, a brake controlling valve device operative upon a reduction in brake pipe pressure to a brake application position in which fluid under pressure is vented from the brake pipe and fluid under pressure is supplied to effect an application of the brakes, and a transfer valve device normally establishing a communication through which fluid vented from the brake pipe flows to the atmosphere and a communication through which fluid under pressure supplied by the brake controlling valve device flows to the auxiliary brake cylinder and operative upon a predetermined increase in auxiliary brake cylinder pressure for closing the brake pipe venting communication to the atmosphere and for establishing a communication through which fluid vented from the brake pipe and fluid supplied by the brake controlling valve device flows to the main brake cylinder.

20. In a fluid pressure brake, in combination, a brake pipe, a main brake cylinder, an auxiliary brake cylinder, a brake controlling valve device operative upon a reduction in brake pipe pressure to a brake application position in which fluid under pressure is vented from the brake pipe and fluid under pressure is supplied to effect an application of the brakes, a transfer valve device normally establishing a communication through which fluid vented from the brake pipe flows to the atmosphere and a communication through which fluid under pressure supplied by the brake controlling valve device flows to the auxiliary brake cylinder and operative upon a predetermined increase in auxiliary brake cylinder pressure for closing the brake pipe venting communication to the atmosphere and for establishing a communication through which fluid vented from the brake pipe and fluid supplied by the brake controlling valve device flows to the main brake cylinder, and means operative to limit the amount of fluid under pressure vented from the brake pipe to the main brake cylinder.

21. In a fluid pressure brake, in combination, a brake pipe, a main brake cylinder, an auxiliary brake cylinder, a brake controlling valve device operative upon a reduction in brake pipe pressure to a brake application position in which fluid under pressure is vented from the brake pipe and fluid under pressure is supplied to effect an application of the brakes, a transfer valve device normally establishing a communication through which fluid vented from the brake pipe flows to the atmosphere and a communication through which fluid under pressure supplied by the brake controlling valve device flows to the auxiliary brake cylinder and operative upon a predetermined increase in auxiliary brake cylinder pressure for closing the brake pipe venting communication to the atmosphere and for establishing a communication through which fluid vented from the brake pipe and fluid supplied by the brake controlling valve device flows to the main brake cylinder, and means operative upon a predetermined increase in main brake cylinder pressure for cutting off the flow of fluid from the brake pipe.

22. In a fluid pressure brake, in combination, a brake pipe, a main brake cylinder, an auxiliary brake cylinder, a brake controlling valve device operated upon a reduction in brake pipe pressure to effect an application of the brakes and operated upon an increase in brake pipe pressure to effect a release of the brakes, a valve mechanism controlled by the brake controlling valve device in effecting an application of the brakes to first supply fluid under pressure to the auxiliary brake cylinder and then to the main brake cylinder and controlled by the brake controlling valve device in effecting a release of the brakes to vent fluid under pressure from the brake cylinders in the reverse order, the operation of said valve mechanism to completely vent the auxiliary brake cylinder being independent of the operation of the brake cylinders.

23. In a fluid pressure brake, in combination, a brake pipe, a brake cylinder, a brake controlling valve device operated upon a reduction in brake pipe pressure for supplying fluid under pressure to the brake cylinder and upon a subsequent increase in brake pipe pressure for releasing fluid from the brake cylinder, and valve means normally subject to fluid under pressure and controlling communication through which said valve device releases fluid from the brake cylinder and operated upon release of fluid under pressure for closing said communication, said valve device being operable upon an increase in brake pipe pressure to release fluid under pressure from said valve means.

24. In a fluid pressure brake, in combination, a brake pipe, a main brake cylinder, a take-up brake cylinder, a brake controlling valve device operated upon a reduction in brake pipe pressure for effecting the supply of fluid under pressure to said brake cylinders and upon a subsequent increase in brake pipe pressure for effecting the release of fluid from said brake cylinders, and valve means normally subject to fluid under pressure for controlling communication through which said valve device releases fluid from the take-up brake cylinder and operated upon a release of fluid under pressure for closing said communication, said valve device being operable upon an increase in brake pipe pressure to release fluid under pressure from said valve means.

CLYDE C. FARMER.
DONALD L. McNEAL.